United States Patent
Chong

(10) Patent No.: US 10,328,296 B2
(45) Date of Patent: Jun. 25, 2019

(54) BRACKET FOR INSTALLATION OF A FIRE PROTECTION SPRINKLER

(71) Applicant: The Reliable Automatic Sprinkler Co., Inc., Liberty, SC (US)

(72) Inventor: Taek S. Chong, Lake Forest, CA (US)

(73) Assignee: The Reliable Automatic Sprinkler Co., Inc., Liberty, SC (US)

( * ) Notice: Subject to any disclaimer, the term of this patent is extended or adjusted under 35 U.S.C. 154(b) by 0 days.

(21) Appl. No.: 16/227,434

(22) Filed: Dec. 20, 2018

(65) Prior Publication Data
US 2019/0118015 A1  Apr. 25, 2019

Related U.S. Application Data

(63) Continuation of application No. 15/313,843, filed as application No. PCT/US2015/033016 on May 28, 2015, now Pat. No. 10,173,088.
(Continued)

(51) Int. Cl.
*F16L 3/00* (2006.01)
*A62C 35/68* (2006.01)
(Continued)

(52) U.S. Cl.
CPC .............. *A62C 35/68* (2013.01); *B05B 15/62* (2018.02); *B05B 15/63* (2018.02); *F16L 3/1033* (2013.01); *F16L 3/24* (2013.01)

(58) Field of Classification Search
CPC .............................. H02G 3/125; F16M 13/027
(Continued)

(56) References Cited

U.S. PATENT DOCUMENTS 1,056,759 A   3/1913  Mallery
1,156,885 A  10/1915  Caine
(Continued)

FOREIGN PATENT DOCUMENTS

DE   3919638 C1   11/1990
JP   55-40163 U    3/1980
(Continued)

OTHER PUBLICATIONS

T-Grid Box Hanger, Electrical Acoustical; CADDY, p. 150 (Date not indicated).
(Continued)

*Primary Examiner* — Steven M Marsh
(74) *Attorney, Agent, or Firm* — Venable LLP

(57) ABSTRACT

To install a sprinkler fitting for a fire protection sprinkler in a building, a support bracket includes a support beam, end brackets, and center bracket. The center bracket includes a body having an upper portion and a lower portion, each having an arcuate slot defining an opening to receive a sprinkler fitting, and a closure assembly having a first pin and a closure member having a first end rotatably mounted to the body, between the upper portion and the lower portion, by the first pin, and a second end that includes a handle. When the closure member is in a closed position, and the sprinkler fitting is received in the opening, the closure assembly presses the sprinkler fitting against at least one of the body and the support beam, and urges the center bracket against the support beam to maintain the center bracket stationary relative to the support beam.

30 Claims, 8 Drawing Sheets

Related U.S. Application Data

(60) Provisional application No. 62/003,930, filed on May 28, 2014.

(51) Int. Cl.
  *B05B 15/63* (2018.01)
  *F16L 3/10* (2006.01)
  *F16L 3/24* (2006.01)
  *B05B 15/62* (2018.01)

(58) Field of Classification Search
  USPC .............................. 248/75, 80, 89, 342, 343
  See application file for complete search history.

(56) References Cited

U.S. PATENT DOCUMENTS

| | | |
|---|---|---|
| 2,375,513 A | 5/1945 | Bach |
| 3,341,909 A | 9/1967 | Havener |
| 3,529,671 A | 9/1970 | Adams, Jr. |
| 3,556,452 A | 1/1971 | Ramsey et al. |
| 3,558,091 A | 1/1971 | Bush |
| 3,597,889 A | 8/1971 | Lo Nigro |
| 3,608,857 A | 9/1971 | Ibbeler |
| 3,612,461 A | 10/1971 | Brown |
| 3,652,780 A | 3/1972 | Wilson |
| 3,675,952 A | 7/1972 | Mears |
| 3,685,235 A | 8/1972 | Lang |
| 3,703,307 A | 11/1972 | Curtis |
| 3,797,789 A | 3/1974 | Wasson |
| 3,848,385 A | 11/1974 | Thompson |
| 4,041,657 A | 8/1977 | Schuplin |
| 4,122,762 A | 10/1978 | Williams |
| 4,149,693 A | 4/1979 | LoNigro |
| 4,484,634 A | 11/1984 | Swanson et al. |
| 4,717,099 A | 1/1988 | Hubbard |
| 4,785,887 A | 11/1988 | Miller |
| 4,834,186 A | 5/1989 | Ballard |
| 5,002,318 A | 3/1991 | Witter |
| 5,018,586 A | 5/1991 | Cawley et al. |
| 5,085,393 A | 2/1992 | Ryan |
| 5,127,479 A | 7/1992 | Stehling et al. |
| 5,316,254 A | 5/1994 | McCartha |
| 5,327,976 A | 7/1994 | Hattori |
| 5,396,959 A | 3/1995 | Macdonald |
| 5,433,383 A | 7/1995 | Sundholm |
| 5,516,068 A | 5/1996 | Rice |
| 5,570,745 A | 11/1996 | MacDonald, III |
| 5,609,212 A | 3/1997 | McHugh |
| 5,619,263 A | 4/1997 | Laughlin et al. |
| 5,622,341 A | 4/1997 | Stana |
| 5,667,018 A | 9/1997 | Hone et al. |
| 5,699,641 A | 12/1997 | Tinen et al. |
| 5,743,337 A | 4/1998 | MacDonald, III |
| 5,794,853 A | 8/1998 | Perkins |
| 5,842,526 A | 12/1998 | Archer et al. |
| 5,845,886 A | 12/1998 | McCormick |
| 6,119,784 A | 9/2000 | MacDonald, III et al. |
| 6,123,154 A | 9/2000 | MacDonald, III et al. |
| 6,260,810 B1 | 7/2001 | Choi |
| 6,488,097 B1 | 12/2002 | MacDonald, III et al. |
| 6,554,231 B2 | 4/2003 | Choi |
| 6,752,218 B2 | 6/2004 | MacDonald, III et al. |
| 6,811,130 B1 | 11/2004 | Oh |
| 6,907,938 B2 | 6/2005 | MacDonald, III et al. |
| 7,032,680 B2 | 4/2006 | MacDonald, III et al. |
| 7,240,884 B2 | 7/2007 | Shim |
| 7,255,315 B2 | 8/2007 | Oh |
| 7,264,214 B2 | 9/2007 | Oh |
| 7,296,634 B2 | 11/2007 | MacDonald, III et al. |
| 7,427,051 B2 | 9/2008 | Oh |
| 7,735,787 B2 | 6/2010 | Kafenshtok et al. |
| 7,784,746 B2 | 8/2010 | Kafenshtok et al. |
| 7,845,599 B2 | 12/2010 | Jackson |
| 7,878,464 B2 | 2/2011 | Oh |
| 8,109,482 B2 | 2/2012 | Oh |
| 8,272,615 B2 | 9/2012 | Silcox et al. |
| 8,413,734 B2 | 4/2013 | Silcox et al. |
| 8,474,199 B2 | 7/2013 | Oh |
| 8,500,079 B2 | 8/2013 | Oh |
| 8,678,330 B2 | 3/2014 | Silcox et al. |
| 8,740,158 B2 | 6/2014 | Silcox et al. |
| 8,851,196 B2 | 10/2014 | Silcox et al. |
| 9,004,421 B2 | 4/2015 | Feenstra |
| 9,004,422 B2 | 4/2015 | Feenstra |
| 9,339,674 B2 | 5/2016 | Silcox et al. |
| 9,731,156 B2 * | 8/2017 | Jung ..................... A62C 35/68 |
| 2005/0139743 A1 * | 6/2005 | Shim ..................... E04B 9/006 248/342 |
| 2006/0192067 A1 * | 8/2006 | Oh ........................ A62C 35/68 248/342 |
| 2007/0039743 A1 | 2/2007 | MacDonald, III et al. |
| 2007/0063121 A1 * | 3/2007 | Oh ........................ A62C 35/68 248/342 |
| 2008/0066932 A1 | 3/2008 | MacDonald, III et al. |
| 2011/0094760 A1 | 4/2011 | Im |
| 2011/0186697 A1 | 8/2011 | Hickle et al. |
| 2011/0315409 A1 | 12/2011 | Silcox et al. |
| 2012/0298384 A1 | 11/2012 | Silcox et al. |
| 2016/0023028 A1 | 1/2016 | Jung |

FOREIGN PATENT DOCUMENTS

| | | |
|---|---|---|
| JP | 2-96160 U | 7/1990 |
| JP | 2-010 | 11/1990 |
| JP | 04-361759 A | 12/1992 |
| JP | 05-060283 A | 3/1993 |
| JP | 05-84321 A | 4/1993 |
| JP | 05-137810 A | 6/1993 |
| JP | 05-309146 A | 11/1993 |
| JP | 05-329223 A | 12/1993 |
| JP | 6-23064 A | 2/1994 |
| JP | 06-125999 A | 5/1994 |
| JP | 06-201071 A | 7/1994 |
| JP | 06-83047 U | 11/1994 |
| JP | 06-337082 A | 12/1994 |
| JP | 07-17259 U | 3/1995 |
| JP | 7-096050 | 4/1995 |
| JP | 07-151269 A | 6/1995 |
| JP | 07-166634 | 6/1995 |
| JP | 8-038641 | 2/1996 |
| JP | 09-655 A | 1/1997 |
| JP | 09-28829 A | 2/1997 |
| JP | 09-196241 A | 7/1997 |
| JP | 10-043325 A | 2/1998 |
| KR | 124104 S | 3/1992 |
| KR | 93-4992 | 7/1993 |
| KR | 94-9689 B1 | 10/1994 |
| KR | 176800 | 3/1996 |
| KR | 1996-010021 Y1 | 4/1996 |
| KR | 0117170 Y1 | 4/1996 |
| KR | 176800 S | 4/1996 |
| KR | 94-029700 | 2/1998 |
| KR | 6028 | 10/1998 |

OTHER PUBLICATIONS

System Ceiling Standard Installation Outline: Line Type Steel Single-line Construction Method, 2000, pp. 1-31, The Rock Wool Association.

Fierro, Eduardo A., Reducing the Risks of Nonstructural Earthquake Damage: A Practical Guide, Sep. 1994, pp. 1-12, FEMA 74/Sep. 1994, United States.

Standard Specification for the Manufacture, Performance, and Testing of Metal Suspension Systems for Acoustical Tile and Lay-in Panel Ceilings, American Society for Testing and Materials, pp. 1-8, Jun. 1998.

Adjustable Drop Nipples for Fire Sprinkler Systems: Installation Instructions, Tofle Co., Inc., (Date not indicated).

Pipe Hangers & Supports Pamphlet, Nichiei Intec Co., Ltd., DEF000280-DEF000283 (Date not indicated).

Fasteners Conduit Supports T-Bar Hangers, A&G Manufacturing Co., Inc., SupplyNet pp. 1840-1855 (Date not indicated).

(56) References Cited

OTHER PUBLICATIONS

Fasteners Conduit Supports T-Bar Hangers, A&G Manufacturing Co., Inc., SupplyNet pp. 1856-1867 (Date not Indicated).
Pipe Hangers & Supports, Nichiei Intec. Co., Ltd., DEF000183-DEF000186, 1996.
Holdrite Brackets, Hubbard Enterprises, pp. DEF001899-DEF001901 (Date not indicated).
"Our New Center-of-Tile is making us the center of attention," FlexHead Industries (Date not indicated).
OC & B Industries, Inc., "EZ-Drop Flexible Joint Sprinkler System," Sep. 20, 1999.
R.B. Sprinkler Joint Technical Data (Adjustable Drop Nipple), Young Won E.N.C. Ltd., Aug. 8, 1994.
Quality Electrical Products, GB Electrical Inc., 1991, cover page, pp. 186-189, 210-211, back cover, catalog #AD-240, United States.
Spring Steel Clips for the Construction Industry, Thomas Industries Inc.; Tool & Fastener Division, cover page, pp. 38-39, 42-44, 60-61, back cover, United States.

\* cited by examiner

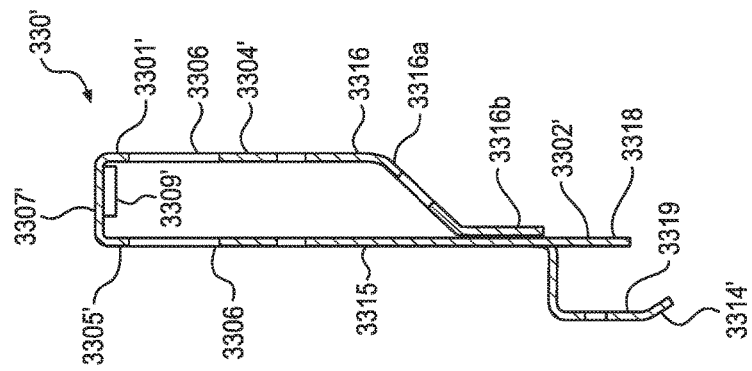
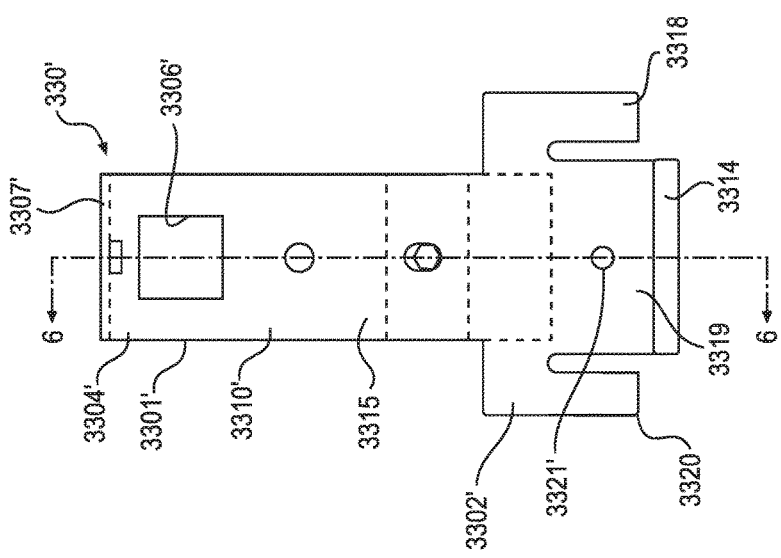
FIG. 5
FIG. 6

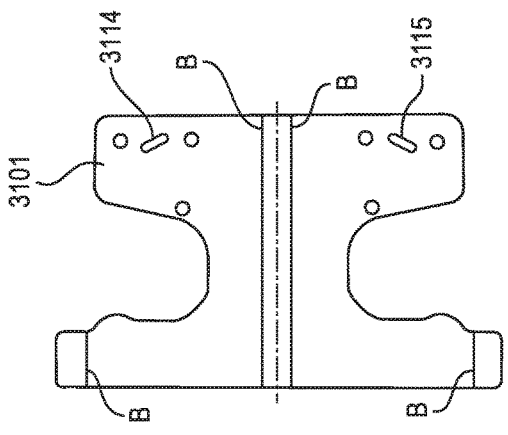
FIG. 9
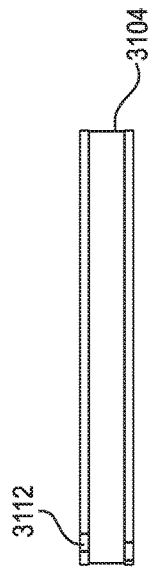
FIG. 11
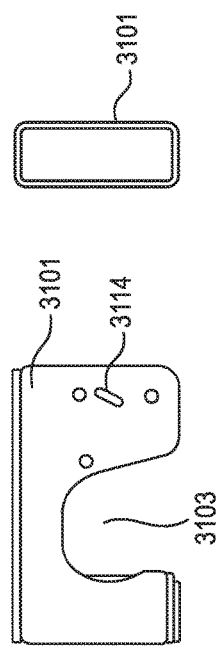
FIG. 8
FIG. 7
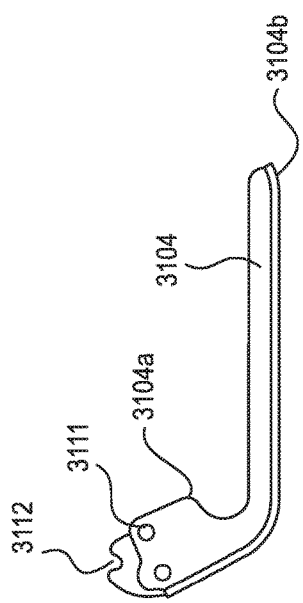
FIG. 10

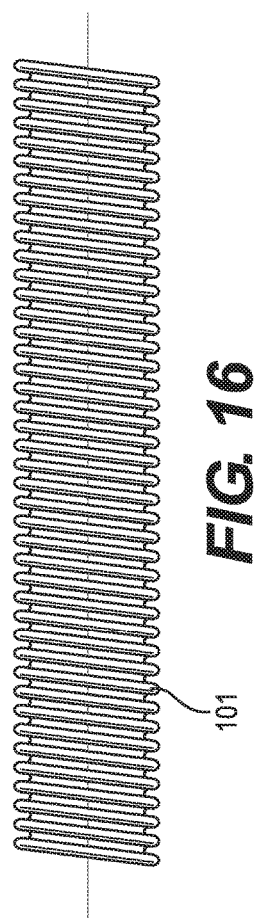

BRACKET FOR INSTALLATION OF A FIRE PROTECTION SPRINKLER

CLAIM TO PRIORITY

This application is a continuation application of copending U.S. patent application Ser. No. 15/313,843, filed Nov. 23, 2016, which is a U.S. national stage application of International Patent Application No. PCT/US2015/033016, filed May 28, 2015, which claims priority to U.S. Provisional Patent Application No. 62/003,930, filed May 28, 2014, each of which is incorporated by reference herein in its entirety.

BACKGROUND OF THE INVENTION

Field of the Invention

The present invention relates generally to the field of fire protection sprinklers and related equipment, and, more particularly, relates to a bracket that can be used in installing, for example, a flexible fire protection sprinkler, and to a method of installing such a support bracket.

Description of Related Art

Fire protection sprinklers are used to protect many different kinds of occupancies against the risk of fire, including commercial establishments, storage facilities, office buildings, public buildings, large and small apartment buildings, and even single residence buildings. Many of these buildings have what are sometimes termed a "false ceiling", or a second, visible ceiling below a main ceiling. The second visible ceiling may itself be fairly strong structurally, or it may be relatively lightweight, e.g., to allow for easy updating of the second visible ceiling using esthetically pleasing tiles, or the like, that can be quickly and cheaply replaced if damaged or simply outmoded. Fire protection sprinklers must be located below the second visible ceiling to disperse water, and, therefore, cannot simply be mounted in the main ceiling. That is, the fire protection sprinklers must be positioned at or near the second visible ceiling, and must be able to deliver water directly into a room if activated.

Because pipes that supply water to the fire protection sprinklers may be installed in the main ceiling, fluid conduits are required between the main ceiling and the second visible ceiling to reach the fire protection sprinklers. Also, if holes are cut in the tiles, or other ceiling materials that make up the second visible ceiling, in advance (i.e., prior to installation of the second visible ceiling) to accommodate the fire protection sprinklers, an installer of the fire protection sprinklers must find a way to locate the fire protection sprinklers within the holes. Alternatively, of course, the process of cutting the holes in the tiles, or other ceiling materials, may be performed at the time of installation of the fire protection sprinklers to be sure that the holes are provided at exactly the right locations in the tiles, or other ceiling materials. Either approach requires relatively more time and effort on the part of the installer, and, therefore, is relatively more expensive.

Additionally, if the tenants of an occupancy change, the required layout of the walls and the ceiling of the occupancy, or the desired appearance of the ceiling, may change, and, in some cases, relocation of the fire protection sprinklers is needed to maintain proper location of the fire protection sprinklers with respect to the walls.

SUMMARY OF THE INVENTION

Accordingly, my invention is directed to a support bracket for use in the installation of fire protection sprinklers, e.g., in a building with a suspended ceiling (a false ceiling typically having relatively low strength, and suspended from the building structure by, for example, a cable). A sprinkler fitting is secured in place by the support bracket, and the support bracket itself is adjustable to permit the fire protection sprinkler to be located at a desired position. The support bracket of my invention enables a builder to use inexpensive, flexible tubing as the fluid conduit to supply fluid to the fire protection sprinkler that can be installed quickly, and that requires less skilled labor, time, and costs.

In one embodiment, a support bracket is provided for use in installing a sprinkler fitting for a fire protection sprinkler in a building having a ceiling that includes a structure. The support bracket includes a support beam configured to extend over a space within the structure of the ceiling, at least one end bracket provided at a first end of the support beam, and configured to attach the support bracket to the structure of the ceiling, and a center bracket supported by the support beam, and configured to receive at least a portion of the sprinkler fitting. The center bracket has a body that defines an opening to receive the portion of the sprinkler fitting, and a closure assembly including a closure member that has a first end rotatably connected to the body, and a second end that includes a handle. The closure member rotates about an axis, and is movable between an open position and a closed position. When the closure member is in the closed position and the portion of the sprinkler fitting is received in the opening of the body, the closure assembly presses the portion of the sprinkler fitting against at least one of the body and the support beam and urges the center bracket against the support beam to maintain the center bracket stationary relative to the support beam. In addition, the closure assembly has a lock positioned to engage the closure assembly when the closure member moves in a direction from the open position toward the closed position, and to engage the closure assembly to prevent the closure member from returning from the closed position to the open position.

In another embodiment, an installation apparatus is provided for use in installing a fire prevention sprinkler fitting for a fire protection sprinkler in a building having a ceiling that includes a structure. The installation apparatus includes a flexible conduit configured to connect to a sprinkler fitting, and to a fluid supply conduit in the building. The installation apparatus also includes a support bracket having a support beam configured to extend over a space within the structure of the ceiling, at least one end bracket provided at a first end of the support beam, and configured to attach the support bracket to the structure of the ceiling, and a center bracket supported by the support beam, and configured to receive at least a portion of the sprinkler fitting. The center bracket has a body that defines an opening to receive the portion of the sprinkler fitting, and a closure assembly including a closure member that has a first end rotatably connected to the body, and a second end that includes a handle. The closure member rotates about an axis, and is movable between an open position and a closed position. When the closure member is in the closed position and the portion of the sprinkler fitting is received in the opening of the body, the closure assembly presses the portion of the sprinkler fitting against at least one of the body and the support beam, and urges the center bracket against the support beam to maintain the center bracket stationary relative to the support beam. The center bracket also has a lock positioned to engage the closure assembly when the closure member moves in a direction from the open position toward the closed position, and to engage the closure assembly to prevent the closure member from returning from the closed position to the open position.

In another embodiment, a method of installing a fire protection sprinkler in a building having a ceiling that includes a structure is provided. The method includes the steps of providing a flexible conduit configured to connect to a sprinkler fitting, and to a fluid supply conduit in the building, and providing a support bracket. The support bracket includes a support beam configured to extend over a space within the structure of the ceiling, at least one end bracket provided at a first end of the support beam, and configured to attach the support bracket to the structure of the ceiling, and a center bracket supported by the support beam, and configured to receive at least a portion of the sprinkler fitting. The center bracket has a body that defines an opening to receive the portion of the sprinkler fitting, and a closure assembly including a closure member that has a first end rotatably connected to the body, and a second end that includes a handle. The closure member rotates about an axis, and is movable between an open position and a closed position. When the closure member is in the closed position and the portion of the sprinkler fitting is received in the opening of the body, the closure assembly presses the portion of the sprinkler fitting against at least one of the body and the support beam and urges the center bracket against the support beam to maintain the center bracket stationary relative to the support beam. The center bracket also has a lock positioned to engage the closure assembly when the closure member moves in a direction from the open position toward the closed position, and to engage the closure assembly to prevent the closure member from returning from the closed position to the open position. The method also includes the steps of securing the support bracket in position over the space within the structure of the ceiling, connecting the flexible conduit to an inlet end of the sprinkler fitting, and positioning the sprinkler fitting in the opening of the body of the center bracket. In addition, the method includes the step of moving the closure member from the open position to the closed position, thereby securing the sprinkler fitting in the opening in the body of the center bracket, securing the center bracket in a position on the support beam, and locking the closure member in the closed position.

BRIEF DESCRIPTION OF THE DRAWINGS

FIGS. 5 and 6 are a front view and a cross-sectional side view, respectively, of an end bracket according to an alternative embodiment.

FIG. 7 is a top view of a body portion of a center bracket of the embodiment shown in FIG. 1A.

FIG. 8 is an end view of the body portion of the center bracket of the embodiment shown in FIG. 1A.

FIG. 9 is a plan view of a sheet of material to be formed into the body portion of the center bracket of the embodiment shown in FIG. 1A.

FIGS. 10 and 11 are a side view and a top view, respectively, of a closure member or a handle of the embodiment shown in FIG. 1A.

FIG. 16 is a side cross-sectional view of a corrugated core of the flexible conduit.

DESCRIPTION OF PREFERRED EMBODIMENTS

Figure 1A:
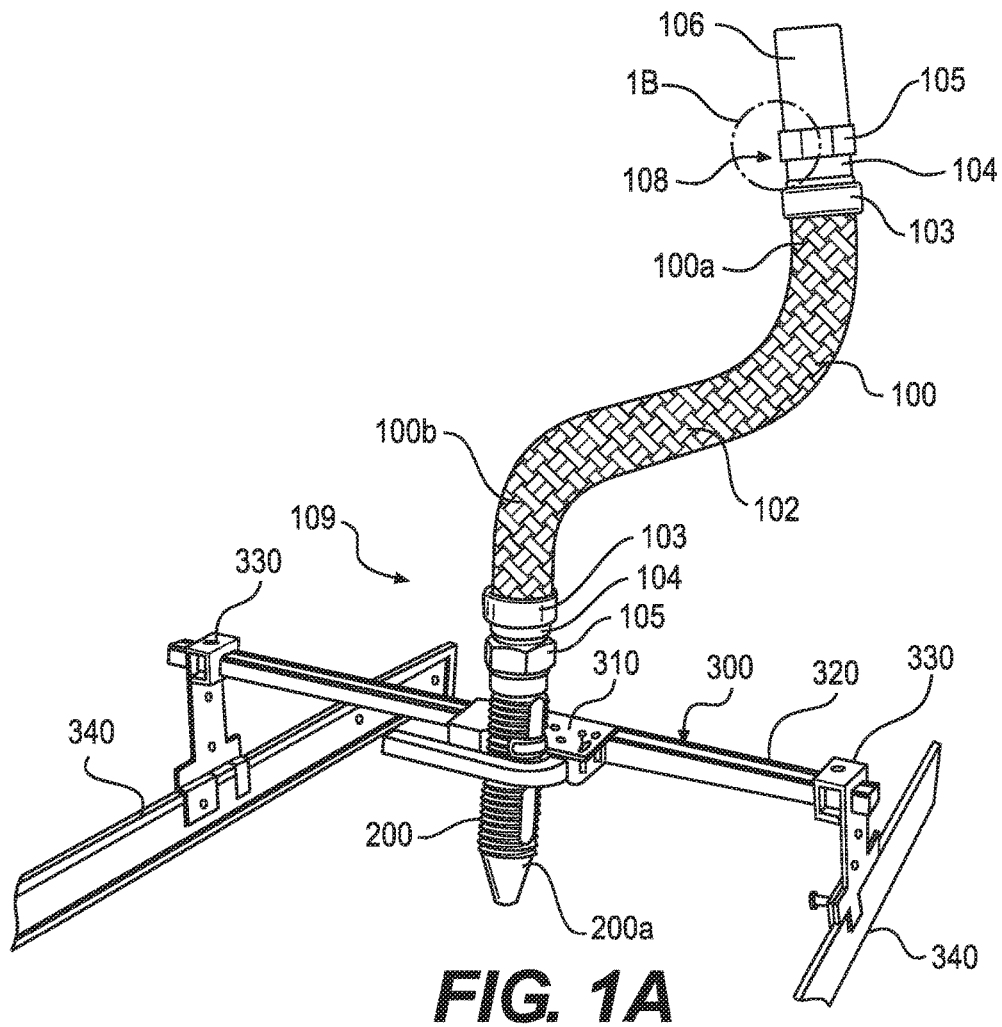
FIG. 1A is an isometric view of an embodiment of the support bracket and a flexible fire protection sprinkler in accordance with the invention.

FIG. 1A shows a support bracket 300 according to one embodiment that can be used to install a system of fire protection sprinklers. In this embodiment, water is to be supplied to a fire protection sprinkler (not shown) by means of a flexible conduit 100. The fire protection sprinkler can be mounted at a lower end 200a of a sprinkler fitting 200 that may be, for example, an adapter that is secured to the flexible conduit 100, and the sprinkler fitting 200 is supported and held at a desired position by the support bracket 300. The support bracket 300 has a center bracket 310 that secures and supports the sprinkler fitting 200. The center bracket 310 is supported by a support beam or a support bar 320 that extends over (i.e., above) a room in which the support bracket 300 is installed, and, more specifically, extends over a false ceiling. The support bar 320 is secured to the ceiling or the building structure on at least one end by an end bracket 330. In this embodiment, the false ceiling is a suspended ceiling, constructed as a grid of T-bars 340 that are suspended, for example, by cables (not shown) from a building structure, with the grid supporting ceiling tiles of a desired kind, and the support bar 320 being provided with two end brackets 330, one at each end of the support bar 320. Of course, as an alternative to T-bars, hat channels or rails may be used. Each end bracket 330 is located (i.e., positioned) on the grid of T-bars 340 by engaging with one T-bar 340. As described below, the end brackets 330 may be located along the length of the support bar 320 at the locations needed, with the support bar 320 being cut to an appropriate length based on the dimensions of the grid of T-bars 340. The attachment of the end brackets 330 to the support bar 320 may be done in a permanent way, or, alternatively, the location of the end brackets 330 along the length of the support bar 320 may be adjustable if desired, without departing from the scope of the invention.

In this embodiment, the support bar 320 is made of a length of bar stock having a square cross section. In the embodiment shown in FIG. 1A, the support bar 320 crosses (i.e., spans) a space between two parallel T-bars 340, and is supported on the two T-bars 340 by the end brackets 330. The end brackets 330 in this embodiment are stamped metal plates. The end brackets 330, however, may be made of other materials, if desired, and may be made either of a single piece of material each, or of multiple pieces that are bonded together, if preferred.

Figure 3:
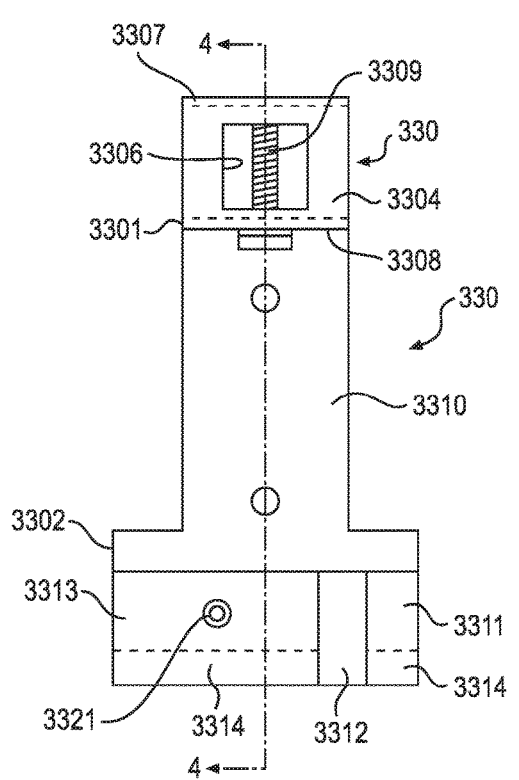
FIGS. 3 and 4 are a front view and a cross-sectional side view, respectively, of an end bracket of the embodiment shown in FIG. 1A.
Figure 4:
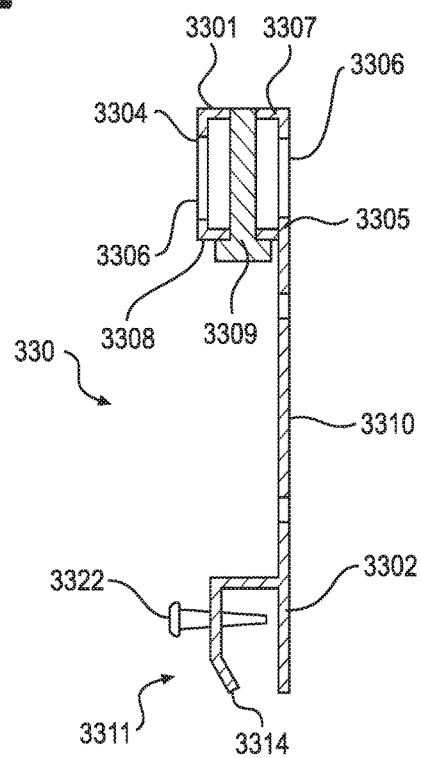
Figure 13:
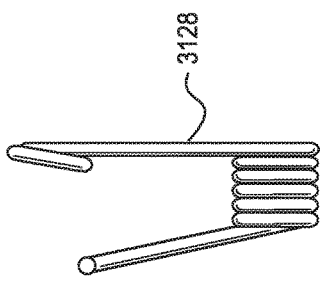
FIG. 13 is a side view of a spring used to bias the lever shown in FIG. 12.

In this embodiment, each end bracket 330, as shown in FIGS. 3 and 4, comprises an upper body 3301, a lower body 3302, also referred to herein as a grip, and a connecting portion 3310, or a connecting body, joining the upper body 3301 and the grip 3302. In this embodiment, when the end bracket 330 is manufactured of a single piece of a metal plate, the upper body 3301 has a first side 3304 and a second side 3305 that face each other, and each of the first side 3304 and the second side 3305 has a square opening 3306 to receive the support bar 320. The first side 3304 and the second side 3305 are joined to each other by at least a third side 3307 that, in this embodiment, is actually a top side of the upper body 3301. The upper body 3301 also includes a fourth side 3308 that is a bottom side. Alternatively, the top side, the bottom side, or both the top side and the bottom side of the upper body 3301 may be left open, and a front side (not shown) and a back side (not shown) of the upper body 3301 may be provided to connect the first side 3304 and the second side 3305 that have the square openings 3306. The end bracket 330 engages with and is secured to the support bar 320 when ends of the support bar 320 are received in the square openings 3306 on the first side 3304 and the second side 3305, and a screw 3309, e.g., a wing screw or other fastener, is inserted through a hole in the fourth side 3308, holes in the support bar 320, and a hole in the third side 3307, as shown in FIGS. 1A and 4. By this arrangement, the third side 3307 and the fourth side 3308 of the upper body 3301 are secured to the support bar 320, as shown in FIG. 1A. The location of the screw 3309 may be varied, and, in the embodiment in which the upper body 3301 has four sides, including a front side and a back side, and does not have a top side or a bottom side, the screw 3309 may be secured in holes provided in the first side 3304 and the second side 3305 of the upper body 3301.

The connecting portion 3310 may be, as shown in FIGS. 3 and 4, a simple strip of metal or a length of a plate, preferably integral with the material that forms the upper body 3301 and the grip 3302.

The grip 3302 of the end bracket 330 has at least one leg 3311 extending down from the connecting portion 3310 to extend beside the T-bar 340. In this embodiment, three legs, including a first leg 3311, a second leg 3312, and a third leg 3313, are provided, with the first leg 3311 and the third leg 3313 being located generally between the T-bar 340 and the center bracket 310 (i.e., the first leg 3311 and the third leg 3313 are inboard with respect to the T-bar 340), and the T-bar 340 being located between the second leg 3312 and the center bracket 310 (i.e., the second leg 3312 is outboard with respect to the T-bar 340), as shown in FIG. 1A. In this embodiment, each of the first leg 3311 and the third leg 3313 has a lowermost portion 3314 that is bent toward the T-bar 340 at an angle (as shown, with respect to the first leg 3311, in FIG. 4). At least one of the first leg 3311 and the third leg 3313 has an aperture 3321 to receive a nail 3322 for securing the grip 3302 to the T-bar 340. Alternatively, a screw or another device may be used instead of the nail 3322. In this embodiment, the second leg 3312 is between the first leg 3311 and the third leg 3313, as shown in FIG. 3, and a combined width (along a dimension that is parallel to the T-bar 340) of the first leg 3311 and the second leg 3312 is equal to about one-half of a width of the third leg 3313. In other words, the width of the third leg 3313 may be equal to a sum of the width of the first leg 3311, the width of the second leg 3312, and any spaces between the first leg 3311 and the second leg 3312. More specifically, the width of the third leg 3313 may be about 1.4 to about 2.0 times the sum of the width of the first leg 3311, the width of the second leg 3312, and any spaces between the first leg 3311 and the second leg 3312.

In addition, the heights (as measured along a dimension that is parallel to the connecting portion 3310 and that is perpendicular to both the support bar 320 and the T-bar 340) of each of the first leg 3311, the second leg 3312, and the third leg 3313 may be equal to each other. Alternatively, a height of one of the first leg 3311, the second leg 3312, and the third leg 3313 may differ from the heights of the other two of the first leg 3311, the second leg 3312, and the third leg 3313, or the heights of the first leg 3311, the second leg 3312, and the third leg 3313 may differ from each other. In a preferred embodiment, the height of the first leg 3311 and the height of the third leg 3313, each having the lowermost portion 3314 that is bent, may be greater than the height of the second leg 3312. Other proportions, however, are also within the scope of my invention.

In another embodiment, illustrated in FIGS. 5 and 6, the upper body 3301' does not have a bottom side, and the first side 3304' and the second side 3305', in which the openings 3306' for the support bar 320 are provided, are connected by a top side 3307'. The top side 3307' includes a hole through which a screw 3309' is inserted, as shown in FIG. 6, to secure the end bracket 330' to the support bar 320. In addition, the first side 3304' and the second side 3305' include a first extension 3316 and a second extension 3315, respectively, that extend downward from the upper body 3301' to the grip 3302', as shown in FIG. 6, and the first extension 3316 and the second extension 3315 together serve as the connecting portion 3010'. As shown in FIG. 6, the first extension 3316 on the first side 3305' is parallel to the second extension 3315, at least in part. The first extension 3316 includes a lower end 3316a that is bent toward the second extension 3315 toward a top of the grip portion 3302', and a flat lower portion 3316b that lies flat on the second extension 3315. The first extension 3316 is secured to the second extension 3315 at the flat lower portion 3316b.

In this embodiment, the grip 3302' of the end bracket 330' has preferably at least a first leg 3318, a second leg 3319, and a third leg 3320 extending down from the connecting portion 3310' to extend beside the T-bar 340. In this embodiment, when the end bracket 330' is mounted to the T-bar 340, the first leg 3318 and the third leg 3320 are provided to one side of the T-bar 340, and the second leg 3319 is provided to the other side of the T-bar 340. In contrast with the first embodiment, a width of the second leg 3319 (referring again to a dimension parallel to the T-bar 340) is roughly equal to, or slightly greater than, a combined width of the first leg 3318 and the third leg 3320, and is located between the first leg 3318 and the second leg 3320, as shown in FIG. 5. In this embodiment, the second leg 3319 has a lowermost portion 3314' that is bent toward the T-bar 340 at an angle, as in the first embodiment. At least one of the first leg 3318, the second leg 3319, and the third leg 3320 has an aperture 3321' to receive a nail 3322 (see FIG. 4) for securing the grip 3302' to the T-bar 340. The width of the second leg 3319 may be equal to a sum of the width of the first leg 3318, the width of the third leg 3320, and any spaces between the second leg 3319 and either one of the first leg 3318 and the third leg

3320. More specifically, the width of the second leg 3319 may be about 1.4 to about 2.0 times the sum of the width of the first leg 3318, the width of the third leg 3320, and any spaces between the second leg 3319 and either one of the first leg 3318 and the third leg 3320.

In addition, the heights (as measured along a dimension that is parallel to the connecting portion 3310' and that is perpendicular to both the support bar 320 and the T-bar 340) of each of the first leg 3318, the second leg 3319, and the third leg 3320 may be equal to each other. Alternatively, a height of one of the first leg 3318, the second leg 3319, and the third leg 3320 may differ from the heights of the other two of the first leg 3318, the second leg 3319, and the third leg 3320, or the heights of the first leg 3318, the second leg 3319, and the third leg 3320 may differ from each other. In a preferred embodiment, the height of the second leg 3319 having the lowermost portion 3314' that is bent may be greater than the height of the first leg 3318 and the height of the third leg 3320. Other proportions, however, are also within the scope of my invention.

The exact design of the grip 3202/3202' may be varied without departing from the broad scope my invention, but it is preferred to have one of the structures shown in FIGS. 3-6, as they are simple, provide a secure attachment to the T-bar 340, and can be manufactured easily. In both embodiments, the end brackets 330/330' may be provided with holes 3323 (e.g., in the connecting portions 3310/3310') by means of which the end brackets 330/330' may be nailed or screwed to beams or similar support elements, where such beams are used in the building, and are made of a material that admits of the use of nails or screws.

Figure 2:
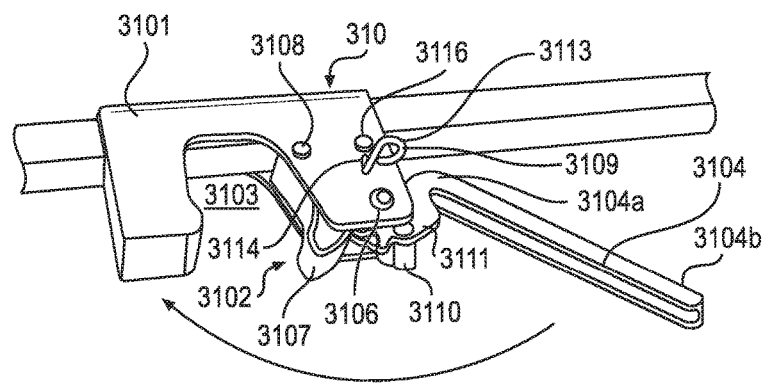
FIG. 2 is a partial isometric view of the embodiment shown in FIG. 1A.

The center bracket 310, shown in FIG. 2, has a main body 3101 and a closure assembly 3102. The main body 3101 defines an opening 3103 to receive the sprinkler fitting 200 for a fire protection sprinkler, and the closure assembly 3102 includes a closure member 3104, or a handle, that has a first end 3104a rotatably connected to the main body 3101 and a second end 3104b that is not connected to the main body 3103. The handle 3104 can be rotated between a first position (shown in FIG. 2) (i.e. an open position), and a second position, in which the sprinkler fitting 200 is received in the opening 3103 and is secured by the closure assembly 3102 (shown in FIG. 1A) (i.e., a closed position). When the handle 3104 is in the closed position, the handle 3104 presses the sprinkler fitting 200 against the main body 3101 and the support bar 320 via a lever 3107, described below.

In this embodiment, the center bracket 310 is constructed to be able to slide along the support beam 320, and to assist an installer in locating the center bracket 310 correctly. The support beam 320 preferably has markers, such as indentations or laser markings, at predetermined lengths (for example, every 6 inches or every 152.4 mm) from the end brackets 330/330'. When the handle 3104 is in the closed position, the handle 3104 urges the center bracket 310 against the support bar 320, producing friction that tends to maintain the center bracket 310 stationary relative to the support bar 320.

The center bracket 310 also has a lock assembly to lock the handle 3104 in the closed position as described below.

In this embodiment, the main body 3101 of the center bracket 310 is made of a sheet of material, as illustrated in FIG. 9. The sheet of material, being shaped as shown in FIG. 9, is then bent at each of the lines labeled "B", forming the sheet of material into a box-like form, as shown in a side view in FIG. 7, and in an end view in FIG. 8. The shape of the main body 3101 defines the opening 3103 into which the sprinkler fitting 200 is received and secured.

The structure, arrangement, and operation of the other components of the closure assembly are shown and described with reference to FIGS. 10 to 15.

The handle 3104 is mounted to the main body 3101 by a first pin 3106, about which the handle 3104 can rotate relative to the main body 3101. As shown in FIG. 2, the handle 3104 does not extend straight from the first pin 3106, but is spaced from the first pin 3106 by the shape of the first end 3104a of the handle 3104. The first end 3104a of the handle nearest to the first pin 3106 is shaped to cooperate with other components in a manner described below.

Figure 12:
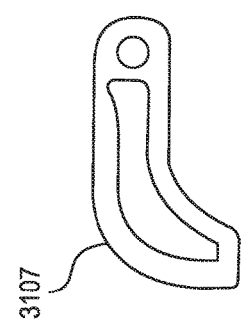
FIG. 12 is a side view of a lever or a hook of the embodiment shown in FIG. 1A.

The closure assembly 3102 also includes a lever 3107, or a hook, shown in FIG. 12, that is mounted to the main body 3101 by a second pin 3108, about which the lever 3107 can rotate relative to the main body 3101. An axis of rotation of the handle 3104 is parallel to an axis of rotation of the lever 3107.

Figure 15:
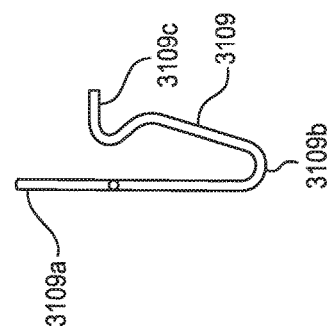
FIGS. 14 and 15 are side views of a lock member of the center bracket of the embodiment shown in FIG. 1A.
Figure 14:
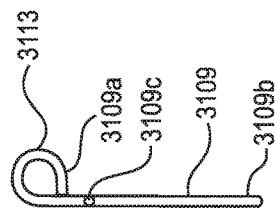
Figure 18:
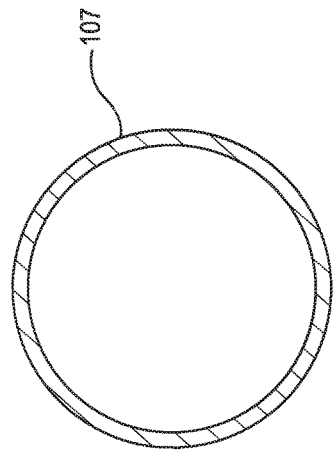
FIG. 18 is an end view of the O-ring shown in FIG. 17.
Figure 20:
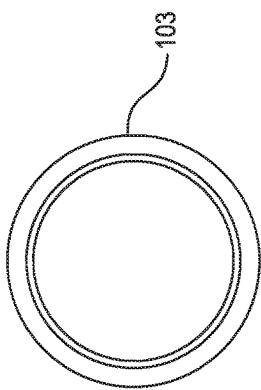
FIG. 20 is an end view of the end pipe shown in FIG. 19.
Figure 17:
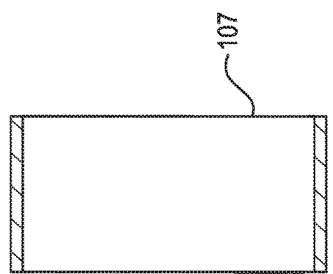
FIG. 17 is a side cross-sectional view of an O-ring that is used with a fitting.
Figure 19:
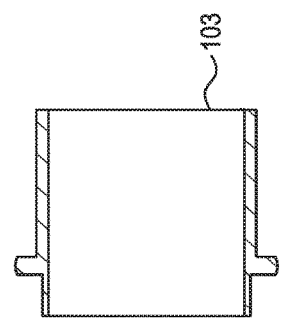
FIG. 19 is a side cross-sectional view of an end pipe that is part of the fitting.
Figure 21:
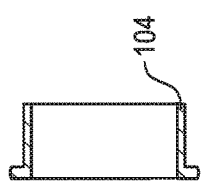
FIG. 21 is a cross-sectional side view of an insulation ring that is used with the fitting.
Figure 22:
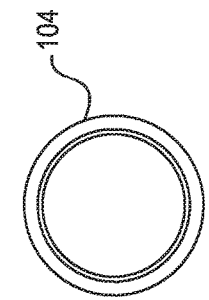
FIG. 22 is an end view of the insulation ring shown in FIG. 21.

A spring 3109 serves as a lock and as a lock release, and includes a looped end 3109a, a bent portion 3109b, and a free end 3109c, as shown in FIGS. 14 and 15, with the looped end 3109a and the free end 3109c extending from a slot 3114 provided in an upper surface of the main body 3101 of the center bracket 310, near the first pin 3106, as shown in FIGS. 1A and 2. That is, the spring 3109 is formed of one piece of metal that is bent somewhat like a hairpin. The bent portion 3109b is received in a slot 3115 (shown in FIG. 9) provided in a lower surface of the main body 3101 of the center bracket 310. The free end 3109c is bent and inserted into the slot 3114 to hold the spring 3109 in place in the main body 3101 of the center bracket 310, and the looped end 3109a is formed into a ring 3133 to permit the spring 3109 to be grasped and operated, as described below.

A third pin 3116, shown in FIG. 2, anchors a second spring 3128 that biases the lever 3107 to rotate toward the handle 3104 (that is, counterclockwise in FIG. 2). The handle 3104 and the lever 3107 are positioned near each other such that rotation of the handle 3104 toward the closed position causes the first end 3104a of the handle 3104 to contact and to press the lever 3107 toward the opening 3103 in which the sprinkler fitting 200 is received. A ring or a roller 3110 is mounted on an axis 3111 in the first end 3104a of the handle 3104, as shown in FIGS. 2 and 10, and enables the handle 3104 to apply a uniform force on the lever 3107 as the handle 3104 is moved from the open position to the closed position, pressing the lever 3107 smoothly into the closed position. As the handle 3104 is closed, the lever 3107 engages the sprinkler fitting 200 and presses the sprinkler fitting 200 against a back surface of the opening 3103, applying a force against the support bar 320 so as to prevent movement of the center bracket 310 along the support bar 320 (in a case in which the center bracket 310 is otherwise free to move along the support bar 320).

It will be understood that the center bracket 310 can slide along the support bar 320, and that closing the closure assembly 3102 on the sprinkler fitting 200 in the center bracket 310 will press the sprinkler fitting 200 against the support bar 320 in such a manner as to prevent such sliding. In use, a builder may attach the support bracket 300 to the T-bars 340 at the correct location, and secure the support bracket 300 in place using screws or other fasteners placed in the grips 3302 of the end brackets 330. The sprinkler fitting 200 may be placed in the center bracket 310, and the center bracket 310 is slid to position the sprinkler fitting 200 as needed. The exact vertical location of the sprinkler fitting 200 in the center bracket 310 may also be adjusted. When the sprinkler fitting 200 is positioned as desired, the closure assembly 3102 is operated, moving the handle 3104 from the open position to the closed position, thereby pressing the sprinkler fitting 200 against the center bracket 310 and maintaining the center bracket 310 at that position relative to the support bar 320.

Rotating the handle 3104 completely into the closed position causes the first end 3104*a* of the handle to contact the spring 3109. In this embodiment, the first end 3104*a* of the handle 3104 includes a notch 3112 (see FIG. 10) to engage and to receive the spring 3109 when the handle 3104 is closed, and the spring 3109, urged into the notch 3112 by its resilience, is retained in the notch 3112 and prevents further rotation of the handle 3104 in either direction. The handle 3104 in the closed position thus holds the lever 3107 in position, pressing the sprinkler fitting 200 and holding the sprinkler fitting 200 in place, and maintaining the center bracket 310 stationary with respect to the support bar 320. It will be appreciated that this provides an extremely simple and quick way to install the support bracket 300, involving a minimum of specialized tools and requiring no plumbing to be done to install the fire protection sprinkler and the sprinkler fitting 200. (Plumbing, of course, is required to install the fluid conduit to supply water to the fire protection sprinklers.)

Unlocking the closure assembly 3102 may be done by pressing the ring 3113 of the spring 3109 to move the spring 3109 out of the notch 3112, allowing the handle 3104 to move back toward the open position. This can be done if the sprinkler fitting 200 is positioned incorrectly at first, or if the fire protection sprinkler must be updated or replaced. Alternative structures may be provided to serve as a lock in place of the spring 3109, including, for example, a rotatable column having a tooth or a key thereon to engage and to hold a corresponding opening in the handle 3104, and a tab may be provided outside of the center bracket 310 to permit manual rotation of the rotatable column from an open position to a closed position (and vice versa if needed).

Figure 1B:
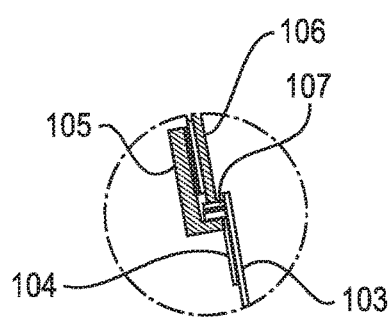
FIG. 1B is a detail cross-sectional view of a portion of the flexible fire protection sprinkler.

An assembly including the sprinkler fitting 200 and the support bracket 300 may be provided together with the flexible conduit 100. An example of a suitable flexible conduit 100 is shown in FIG. 1A. FIGS. 16 to 22 illustrate the components of that flexible conduit 100 in greater detail. The flexible conduit 100 may comprise a corrugated core 101, such as bellows tubing, that is surrounded by a metallic braid 102 (FIG. 1A). An inlet end 100*a* of the flexible conduit 100 has an inlet fitting 108 to be secured to a nipple 106 mounted on the fluid conduit. An outlet end 100*b* of the corrugated core 101 has an outlet fitting 109 to be connected to the sprinkler fitting 200. Each of the inlet fitting 108 and the outlet fitting 109 is formed of an end pipe 103 that is secured to the corrugated core 101 with an insulation ring 104, an O-ring 107, and a nut 105, as shown in FIG. 1B. The nut 105 is internally threaded, so that the inlet end 100*a* of the flexible conduit 100 can be threaded onto the nipple 106, and the outlet end 100*b* of the flexible conduit 100 can be threaded onto the sprinkler fitting 200.

Figure 23:
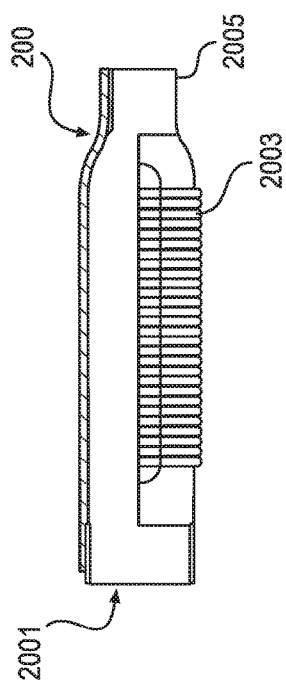
FIGS. 23 and 24 are a partial cross-sectional side view and an end view, respectively, of a sprinkler fitting that can be used with the support bracket according to the embodiments described herein.
Figure 24:
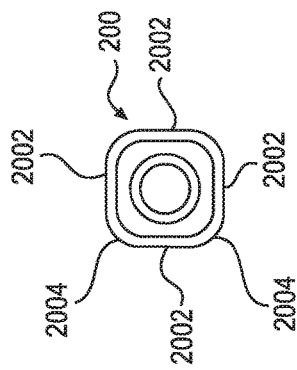

The sprinkler fitting 200, shown in FIGS. 23 and 24, includes an inlet end 2001 that is externally threaded to be received in the nut 105 of the outlet fitting 109 at the outlet end 100*b* of the flexible conduit 100, and has an outlet end 2005 having a relatively smaller internal diameter than that of the inlet end 2001. The outlet end 2005 is internally threaded to receive a fire protection sprinkler (not shown). The sprinkler fitting 200 may be straight, as shown in FIG. 23, or, optionally, may be formed with an elbow. Preferably, an exterior surface of the sprinkler fitting 200 is provided with flats 2002 spaced about a circumference, and with grooving 2003 on the flats 2002. The exterior surface of the sprinkler fitting 200 may also have curved surfaces 2004, or both flats 2002 and curved surfaces 2004, to facilitate gripping with an installation tool.

Preferably, a disposable tie (not illustrated) is provided, for example, at the inlet end 100*a* of the flexible conduit 100, to be used in easily and conveniently securing the outlet end 100*b* of the flexible conduit 100 for tests to be performed at installation. The tie is preferably formed of a material that can easily be cut, to permit the installer to release the lower end 100*b* of the flexible conduit 100 quickly and easily upon completion of the testing.

In preferred embodiments, a length of the flexible conduit 100 may be 24 inches (60.96 cm), 31 inches (78.74 cm), 40 inches (101.6 cm), 48 inches (121.92 cm), 60 inches (152.4 cm), or 72 inches (182.88 cm). If regulations permit, however, the length of the flexible conduit 100 may be different from these values. Also, the inlet end 2001 and the outlet end 2005 of the sprinkler fitting 200 may have inner diameters, respectively, of 1 inch (25.4 mm) and 0.5 inch (12.7 mm), or of 1 inch (25.46 mm) and 0.75 inch (19.05 mm).

While the present invention has been described with respect to what are, at present, considered to be the preferred embodiments, it is to be understood that the invention is not limited to the disclosed embodiments. To the contrary, the invention is intended to cover various modifications and equivalent arrangements included within the spirit and scope of the appended claims.

I claim:

1. A support bracket for use in installing a sprinkler fitting for a fire protection sprinkler in a building having a ceiling that includes a structure, the support bracket comprising:
   (A) a support beam configured to extend over a space within the structure of the ceiling;
   (B) at least one end bracket provided at a first end of the support beam, and configured to attach the support bracket to the structure of the ceiling; and
   (C) a center bracket supported by the support beam, and configured to receive at least a portion of the sprinkler fitting, the center bracket including:
      (a) a body having an upper portion and a lower portion, each of the upper portion and the lower portion having an arcuate slot that defines an opening to receive the portion of the sprinkler fitting;
      (b) a closure assembly including:
         (i) a first pin mounted in the body and having a first pin axis;
         (ii) a closure member having a first end rotatably mounted to the body, between the upper portion and the lower portion, by the first pin, and a second end that includes a handle, the closure member being rotatable about the first pin axis relative to the body, and being movable between an open position and a closed position, wherein, when the closure member is in the closed position and the portion of the sprinkler fitting is received in the opening, the closure assembly presses the portion of the sprinkler fitting against at least one of the body and the support beam, and urges the center bracket against the support beam to maintain the center bracket stationary relative to the support beam;
         (iii) a second pin mounted in the body at a distance from the first pin, the second pin having a second pin axis; and
         (iv) a lever rotatably mounted to the body, between the upper portion and the lower portion, by the second pin, and positioned relative to the closure member such that, when the closure member moves from the open position to the closed position, the closure member contacts and rotates the lever to cause the lever to press the portion of the sprinkler fitting against the at least one of the body and the support beam; and (c) a lock inserted into the body, spaced from the first pin and the second pin, and configured to engage the closure member when the closure member moves in a direction from the open position toward the closed position, and to engage the closure member to prevent the closure member from returning from the closed position to the open position.

2. The support bracket according to claim 1, wherein the closure assembly further includes (d) a spring mounted to the second pin, and configured to urge the lever against such rotation when the closure member moves from the open position to the closed position.

3. The support bracket according to claim 2, wherein the first end of the closure member has a notch, and, when the closure member is in the closed position, the notch engages with the lock to prevent substantial relative movement of the closure member relative to the lock.

4. The support bracket according to claim 3, wherein the notch of the closure member has a shape to mate with a shape of the lock.

5. The support bracket according to claim 3, wherein the notch of the closure member has a concavity to receive the lock upon engaging with the lock.

6. The support bracket according to claim 3, wherein the lock comprises a post that extends along a first direction substantially parallel to the first pin axis and the second pin axis, and a surface of the closure member has a shape to receive the post.

7. The support bracket according to claim 6, wherein the lock further comprises a spring that urges the post in a direction generally toward the first pin axis, and the surface of the closure member receives the post.

8. The support bracket according to claim 6, wherein the post is mounted on the body to be adjustable along a lock axis relative to the body, the lock axis being perpendicular to the first pin axis and to the second pin axis, and
wherein, when the post moves in one direction along the lock axis, the post is secured in the surface of the closure member, and, when the post moves in another direction that is opposite to the one direction, the closure member is released from engagement with the post.

9. The support bracket according to claim 1, wherein the at least one end bracket comprises:
(a) an upper body;
(b) a lower grip; and
(c) a connecting body that joins the upper body and the lower grip.

10. The support bracket according to claim 9, wherein the upper body comprises at least a first side and a second side, each of the first side and the second side:
(i) having an opening configured to receive the support beam; and
(ii) being secured to the support beam.

11. The support bracket according to claim 10, wherein the upper body further comprises at least a third side that joins the first side and the second side.

12. The support bracket according to claim 9, wherein the lower grip comprises:
(i) at least one inboard leg that extends down from the connecting body to extend beside the structure of the ceiling, the at least one inboard leg being positioned between the structure of the ceiling and the center bracket; and
(ii) at least one outboard leg that extends down from the connecting body to extend beside the structure of the ceiling, the structure of the ceiling being positioned between the at least one outboard leg and the center bracket.

13. The support bracket according to claim 12, wherein at least one of the at least one inboard leg and the at least one outboard leg is formed with an aperture to receive a device for securing the lower grip to the structure of the ceiling.

14. The support bracket according to claim 13, wherein the device for securing the lower grip to the structure of the ceiling is one of (a) a nail, and (b) a screw.

15. An installation apparatus for use in installing a fire protection sprinkler in a building having a ceiling that includes a structure, the installation apparatus comprising:
(A) a flexible conduit configured to connect to a sprinkler fitting, and to a fluid supply conduit in the building; and
(B) a support bracket including:
(a) a support beam configured to extend over a space within the structure of the ceiling;
(b) at least one end bracket provided at a first end of the support beam, and configured to attach the support bracket to the structure of the ceiling; and
(c) a center bracket supported by the support beam, and configured to receive at least a portion of the sprinkler fitting, the center bracket having:
(i) a body having an upper portion and a lower portion, each of the upper portion and the lower portion having an arcuate slot that defines an opening to receive the portion of the sprinkler fitting;
(ii) a closure assembly including:
(1) a first pin mounted in the body and having a first pin axis;
(2) a closure member having a first end rotatably mounted to the body, between the upper portion and the lower portion, by the first pin, and a second end that includes a handle, the closure member being rotatable about the first pin axis relative to the body, and being movable between an open position and a closed position, wherein, when the closure member is in the closed position and the portion of the sprinkler fitting is received in the opening, the closure assembly presses the portion of the sprinkler fitting against at least one of the body and the support beam, and urges the center bracket against the support beam to maintain the center bracket stationary relative to the support beam;
(3) a second pin mounted in the body at a distance from the first pin, the second pin having a second pin axis; and
(4) a lever rotatably mounted to the body, between the upper portion and the lower portion, by the second pin, and positioned relative to the closure member such that, when the closure member moves from the open position to the closed position, the closure member contacts and rotates the lever to cause the lever to press the portion of the sprinkler fitting against the at least one of the body and the support beam; and
(iii) a lock inserted into the body, spaced from the first pin and the second pin, and configured to engage the closure member when the closure member moves in a direction from the open position toward the closed position, and to engage the closure member to prevent the closure member from returning from the closed position to the open position.

16. The installation apparatus according to claim 15, wherein the flexible conduit comprises:
(a) bellows tubing; and
(b) braiding that at least partially surrounds the bellows tubing.

17. The installation apparatus according to claim 15, further comprising:
(C) the sprinkler fitting that is configured to connect to the flexible conduit and to the fire protection sprinkler.

18. The installation apparatus according to claim 15, wherein the closure assembly further includes (4) a spring mounted to the second pin, and configured to urge the lever against such rotation when the closure member moves from the open position to the closed position.

19. The installation apparatus according to claim 18, wherein the first end of the closure member has a notch, and, when the closure member is in the closed position, the notch engages with the lock to prevent substantial relative movement of the closure member relative to the lock.

20. The installation apparatus according to claim 19, wherein the notch of the closure member has a shape to mate with a shape of the lock.

21. The installation apparatus according to claim 19, wherein the notch of the closure member has a concavity to receive the lock upon engaging with the lock.

22. The installation apparatus according to claim 19, wherein the lock comprises a post that extends along a first direction substantially parallel to the first pin axis and the second pin axis, and a surface of the closure member has a shape to receive the post.

23. The installation apparatus according to claim 22, wherein the lock further comprises a spring that urges the post in a direction generally toward the first pin axis, and the surface of the closure member receives the post.

24. The support bracket according to claim 22, wherein the post is mounted on the body to be adjustable along a lock axis relative to the body, the lock axis being perpendicular to the first pin axis and to the second pin axis, and wherein, when the post moves in one direction along the lock axis, the post is secured in the surface of the closure member, and, when the post moves in another direction that is opposite to the one direction, the closure member is released from engagement with the post.

25. The installation apparatus according to claim 15, wherein the at least one end bracket comprises:
(i) an upper body;
(ii) a lower grip; and
(iii) a connecting body that joins the upper body and the lower grip.

26. The installation apparatus according to claim 25, wherein the upper body comprises at least a first side and a second side, each of the first side and the second side:
(1) having an opening configured to receive the support beam; and
(2) being secured to the support beam.

27. The installation apparatus according to claim 26, wherein the upper body further comprises at least a third side that joins the first side and the second side.

28. The installation apparatus according to claim 25, wherein the lower grip comprises:
(1) at least one inboard leg that extends down from the connecting body to extend beside the structure of the ceiling, the at least one inboard leg being positioned between the structure of the ceiling and the center bracket; and
(2) at least one outboard leg that extends down from the connecting body to extend beside the structure of the ceiling, the structure of the ceiling being positioned between the at least one outboard leg and the center bracket.

29. The installation apparatus according to claim 28, wherein at least one of the at least one inboard leg and the at least one outboard leg is formed with an aperture to receive a device for securing the lower grip to the structure of the ceiling.

30. The installation apparatus according to claim 29, wherein the device for securing the lower grip to the structure of the ceiling is one of (a) a nail, and (b) a screw.

* * * * *